United States Patent Office 2,716,639
Patented Aug. 30, 1955

2,716,639

POLYMERS FROM UREA AND CHLOROALKYL PHOSPHONYL DICHLORIDES

Alfred Coles Haven, Jr., Hancock's Bridge, N. J., assignor to E. I. du Pont de Nemours and Company, Wilmington, Del., a corporation of Delaware No Drawing. Application July 2, 1954,
Serial No. 441,171

5 Claims. (Cl. 260—77.5)

This invention relates to a new class of polymers and more particularly to new polymeric chloroalkylphosphonamides useful as flame-retardants for synthetic fibers, and a method for their preparation from chloroalkylphosphonyl dichlorides and urea.

Heretofore, the textile trade has been faced with the problem of providing flame-retardant agents for textile fibers. Various phosphorus containing materials have been proposed as flame-retardants; however, these materials possess certain undesirable properties. Therefore, the problem is presented of providing a cheap and effective flame-retardant agent which can be incorporated into the melt or spinning solution of the fiber polymer which will not deleteriously affect the properties of the resulting flame-proofed fiber.

This invention has an object to provide a new class of polymeric chloroalkylphosphonamides. A further object is to provide a method for the preparation of these polymeric chloroalkylphosphonamides. A still further object is to provide polymeric chloroalkylphosphonamides which are effective flame-retardant agents and which do not adversely affect the properties of the resulting flame-proofed textile fiber. Other objects will appear hereinafter.

These and other objects are accomplished by the following invention of polymeric chloroalkylphosphonamides containing in the polymer chain the recurring structural unit

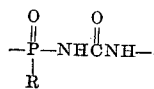

where R is a chloroalkyl radical selected from the group consisting of chloromethyl, dichloromethyl and trichloromethyl radicals. These polymers are prepared by heating a chloroalkyl phosphonyl dichloride, RPOCl₂ wherein R has the value defined above, with urea at a temperature of about 200 to 300° C. until the evolution of hydrogen chloride ceases.

The following examples will better illustrate the nature of the present invention; however the invention is not intended to be limited to these examples.

Example I

A mixture of 7.2 g. of urea and 20.0 g. of chloromethylphosphonyl dichloride was heated under a reflux condenser. Much HCl was evolved at 100°–120° C. The temperature was quickly raised to 300° C. and a vacuum of 40 mm. abs. Hg was applied. After one-half hour the reaction mass was cooled to obtain a fine white powder with M. P. over 300° C. It was soluble in water and alcohol, but not soluble in boiling dimethyl formamide.

*Analysis.*—Calc'd. for $(C_2H_4ClN_2O_2P)_n$: Cl, 22.9; P, 20.1. Found: Cl, 21.9, 21.6; P, 18.9, 19.6.

Example II

A mixture of 5.08 g. of urea and 20. 0 g. of trichloromethylphosphonyl dichloride was heated under a reflux condenser. Hydrogen chloride was evolved vigorously at 150–160° C. Heating was continued to 250–275° C., at which temperature the evolution of HCl was complete. The product was cooled to obtain a solid of M. P. over 300° C. It was soluble in dimethylformamide, but only slightly soluble in water and alcohol.

*Analysis.*—Calc'd. for $(C_2H_2Cl_3N_2O_2P)_n$: Cl, 47.6. Found: Cl, 45.7, 45.9.

The corresponding dichloromethyl compound, which is prepared by this same procedure using a molar equivalent of dichloromethylphosphonyl dichloride instead of mono- or trichloromethylphosphonyl dichloride, has solubility properties intermediate between those of the products of Examples I and II.

As evidenced by the above examples, the solubility properties of the polymers of the present invention vary with their chlorine content. The polymer derived from chloromethylphosphonyl dichloride is readily soluble in water and alcohol, but is completely insoluble in chloroform, benzene and dimethyl formamide while the polymer derived from trichloromethylphosphonyl dichloride exhibits insolubility in water, but is soluble in hot dimethyl formamide. The solubility properties of the polymer derived from dichloromethylphosphonyl dichloride exhibits solubility properties which are intermediate to those of the other two polymers.

While the process of the present invention has been illustrated without the use of a reaction medium, it is to be understood that a reaction medium can be used so long as it is non-reactive under the reaction conditions and has a sufficiently high boiling point, that is, at least 150° C. Examples of diluents which may be used are decalin, diphenyl, kerosene, etc.

The proportionate quantities of urea and phosphonyl dichloride to be used in the process of the present invention are not critical; however, it has been found to be advantageous to use equimolar quantities. Slight excesses, from 5 to 10%, of the urea over the phosphonyl dichloride are not deleterious; however, excesses of phosphonyl dichloride should be avoided since the resulting polymer will then contain readily hydrolyzed chlorine.

The preferred polymers of the present invention are all solids which do not melt below 300° C. and they are all of reasonably high molecular weight; i. e., molecular weights of at least about 1000. It has been found that the polymers are inert towards water and mild acids and bases; however, under vigorous conditions they may be hydrolyzed to the corresponding chloroalkylphosphonic acids and under even more vigorous hydrolysis conditions a cleavage of the carbon-chlorine bond will result.

The polymers of the present invention exhibit attractive utility as flame-retardants for textile fabrics in comparison to previously known flame-retardant phosphorus containing materials.

As many apparently widely different embodiments of this invention may be made without departing from the spirit and scope thereof, it is to be understood that this invention is not limited to the specific embodiments thereof except as defined in the appended claims.

What is claimed is:

1. Polymeric chloroalkylphosphonamides containing in the polymer chain the recurring structural unit

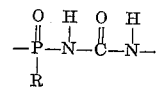

wherein R is a chloroalkyl radical selected from the group consisting of chloromethyl, dichloromethyl and trichloromethyl radicals.

2. Polymeric chloromethylphosphonamide containing in the polymer chain the recurring structural unit

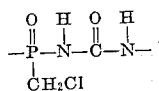

3. Polymeric dichloromethylphosphonamide containing in the polymer chain the recurring structural unit

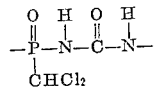

4. Polymeric trichloromethylphosphonamide containing in the polymer chain the recurring structural unit

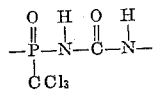

5. A process for the preparation of a polymeric chloroalkylphosphonamide containing in the polymer chain the recurring structural unit

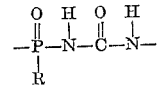

wherein R is a chloroalkyl radical selected from the group consisting of chloromethyl, dichloromethyl and trichloromethyl radicals which comprises heating a chloroalkylphosphonyl dichloride of the formula $RPOCl_2$, wherein R has the values defined above, with urea at a temperature of about 200 to 300° C. until the evolution of hydrogen chloride ceases.

References Cited in the file of this patent
UNITED STATES PATENTS 2,642,413    Coover _____ June 16, 1953